Jan. 16, 1968   W. A. SOKOL   3,363,357
FISH-HOOK GUARD
Filed March 12, 1965

INVENTOR.
WILLIAM A. SOKOL
BY Gordon C. Mack
ATTORNEY 3,363,357
FISH-HOOK GUARD
William A. Sokol, 3201 Ridgewood Road,
Akron, Ohio 44313
Filed Mar. 12, 1965, Ser. No. 439,180
2 Claims. (Cl. 43—42.4)

ABSTRACT OF THE DISCLOSURE

A fish-hook guard of resilient plastic which is large enough to cover the points of hooks such as are attached to a lure, the guard being slit to accommodate the shaft means to which the hooks are attached, and the under surface of the guard being relatively flat with the points of the hooks in contact with it.

---

This invention relates to a guard for use on a fish hook. The guard is designed particularly for multiple hooks comprising three or more barbed points, attached to a lure or the like.

Various types of guards have been proposed for such multiple hooks, but none is as simple, inexpensive and practical as the guard of this invention which has a substantially flat under-surface, and is preferably circular. The top surface is convex so that the guard slides away from other guards or objects when in contact with the same, better than a flat surface would. Also, it gives body to the guard which is thin at the edges, so that it retains its shape. The guard is preferably made of a vinyl plastic. It will vary in size depending upon the spread of the points in the hook on which it is used.

The guard is provided with a central opening which encloses the shaft of the hook, and is slit from the opening to its perimeter so that it may readily be placed on the one or more hooks (usually multiple hooks) on a lure or the like when the lure is placed in the tackle box or other means for transportation or storage, and as easily removed when the lure is removed for use. It is well known that when such lures are placed in a tackle box or the like their hooks easily become engaged with other equipment and when removed for use, time is consumed in disentangling them. The guards of this invention, by being superimposed over the hooks, prevent such entanglement, and it is not necessary that the points of a hook be embedded in the guard in order to function, but this is preferable.

The invention is further described in connection with the accompanying drawings, in which—

FIGURE 1 is a lure with three treble hooks attached to it, each of which is protected by a guard of this invention;

FIGURE 2, a view on the line 2—2 of FIGURE 1, shows in elevation the lower portion of a treblehook with a guard shown in section;

Figure 1:
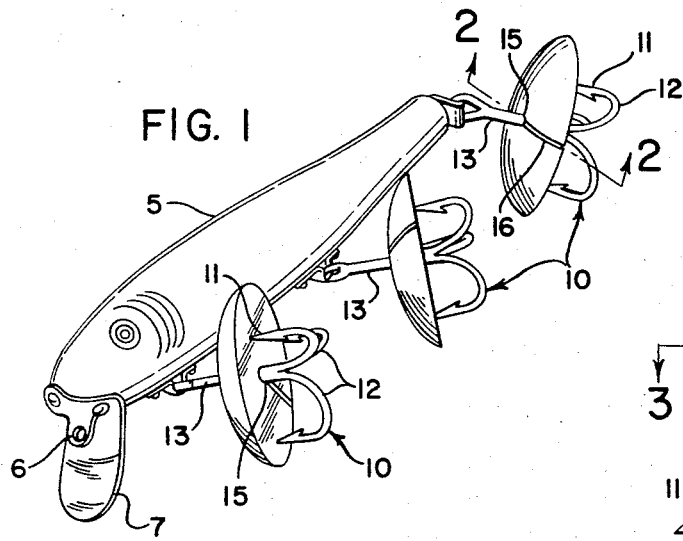
Figure 2:
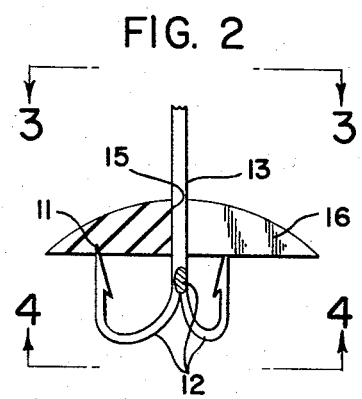
Figure 3:
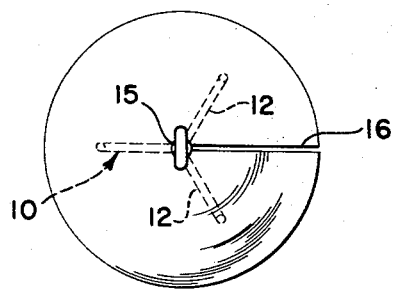
FIGURE 3 is a top view of the same on the line 3—3 of FIGURE 2.
Figure 4:
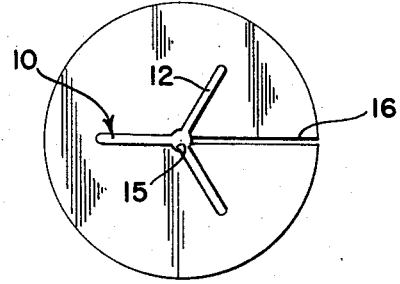
FIGURE 4 is a bottom view of the same on the line 4—4 of FIGURE 2.
Figure 5:
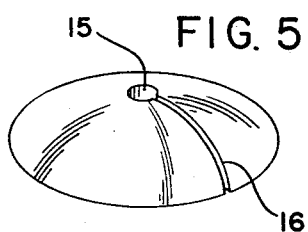
FIGURE 5 is a top perspective view of a guard.

The lure 5 is provided at its front with the opening 6 for the attachment of a line, and a downwardly directed plate 7 which keeps the lure under the surface in trolling.

The treblehooks 10 attached to the lure each comprise a barbed point 11 and shaft 12. The shafts of the hooks shown unite into a single shaft 13, but this is optional. Also, the number of points is optional although the guard is designed more particularly for a device which comprises at least three hooks and might contain four or more. It can be used on a hook with a single point.

The guard includes a central opening 15 and a slit 16 extends from this opening to the perimeter of the guard.

The opening 15 is preferably just large enough to grip the shaft, to help hold the guard in place. It may be somewhat larger but tends to prevent the guard from sliding along the shaft. The area of the guard is somewhat larger than required to cover the points, the distance from the opening to the perimeter being perhaps 125 to 150 percent of the distance of each point from the shaft means.

The invention is covered in the claims which follow.

What I claim is:

1. In the combination of (1) a lure or the like having several fish hooks attached to it, each hook being comprised of shaft means and at least three barbed points, and (2) a removable guard on each hook, which guard extends over the one or more points of the hook and is provided with a single opening which encloses the shaft of the hook and is slit from said opening to its perimeter, the improvement in which the guard is a circular resilient plastic disc with a substantially flat under-surface and a convex upper surface and is relatively thin around its edge, the perimeter of the guard being a greater distance from the shaft than the barbed points of the hooks, which points are in contact with said flat undersurface.

2. In combination with a multi-point fish hook, a fish-hook guard which is a circular vinyl disc which is substantially flat on one side, convex on the other side and relatively thin around its edge, and is provided with a relatively small central opening, the guard being slit from the opening to the circumference of the guard, the shank of the hook being located in said central opening and being accessible thereto by way of said slit with the points of the hook engaging the flat side of said disc.

References Cited

UNITED STATES PATENTS

| | | | |
|---|---|---|---|
| 2,482,881 | 9/1949 | Sonner | 43—57.5 |
| 2,685,756 | 8/1954 | Mowbray | 43—57.5 |
| 2,775,060 | 12/1956 | Barker | 43—57.5 |
| 2,771,704 | 11/1956 | Biggs | 43—57.5 |

FOREIGN PATENTS 1,187,295    3/1959    France.

SAMUEL KOREN, *Primary Examiner.*

D. J. LEACH, *Assistant Examiner.*